US011498847B2

(12) United States Patent
Perez Romo et al.

(10) Patent No.: US 11,498,847 B2
(45) Date of Patent: Nov. 15, 2022

(54) NON-DESTRUCTIVE PROCESS FOR REMOVING METALS, METAL IONS AND METAL OXIDES FROM ALUMINA-BASED MATERIALS

(71) Applicant: Instituto Mexicano del Petroleo, Mexico City (MX)

(72) Inventors: Patricia Perez Romo, Mexico City (MX); Candido Aguilar Barrera, Mexico City (MX); Juan Navarrete Bolanos, Mexico City (MX); Santos Glorindo Reyes Robles, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 16/640,454

(22) PCT Filed: Jul. 27, 2018

(86) PCT No.: PCT/MX2018/050017
§ 371 (c)(1),
(2) Date: Feb. 20, 2020

(87) PCT Pub. No.: WO2019/039930
PCT Pub. Date: Feb. 28, 2019

(65) Prior Publication Data
US 2020/0207635 A1 Jul. 2, 2020

(30) Foreign Application Priority Data
Aug. 23, 2017 (MX) .................. MX/a/2017/010801

(51) Int. Cl.
| | |
|---|---|
| *C01F 7/00* | (2022.01) |
| *C01F 7/46* | (2006.01) |
| *B01J 21/04* | (2006.01) |
| *B01J 21/20* | (2006.01) |
| *B01J 38/02* | (2006.01) |
| *B01J 38/52* | (2006.01) |

(52) U.S. Cl.
CPC ................. *C01F 7/46* (2013.01); *B01J 21/04* (2013.01); *B01J 21/20* (2013.01); *B01J 38/02* (2013.01); *B01J 38/52* (2013.01)

(58) Field of Classification Search
CPC ........ C10G 45/00; C10G 45/04; C10G 45/32; C01F 7/46; B01J 21/04; B01J 21/20; B01J 38/02; B01J 38/52; B01J 23/90; B01J 23/94
See application file for complete search history.

(56) References Cited

U.S. PATENT DOCUMENTS

| | | | |
|---|---|---|---|
| 4,292,282 A | 9/1981 | Welsh et al. | |
| 4,973,462 A | 11/1990 | Akira et al. | |
| 5,017,280 A | 5/1991 | Paris-Marcano | |
| 5,242,670 A | 9/1993 | Gehringer | |
| 5,326,923 A | 5/1994 | Cooper et al. | |
| 5,916,835 A | 6/1999 | Carrol et al. | |
| 6,180,072 B1 | 1/2001 | Veal et al. | |
| 8,716,159 B2 * | 5/2014 | Perez ...................... B01J 38/52 |
| | | | 502/33 |
| 2002/0115554 A1 | 8/2002 | Zhou | |
| 2015/0202614 A1 | 7/2015 | Inoue et al. | |

FOREIGN PATENT DOCUMENTS

| | | | |
|---|---|---|---|
| FR | 2533588 A1 | | 3/1984 |
| MX | 2008016198 A | | 6/2010 |
| WO | 2010/071393 | * | 6/2010 |

* cited by examiner

*Primary Examiner* — Steven J Bos
(74) *Attorney, Agent, or Firm* — FisherBroyles, LLP; Jason P. Mueller

(57) ABSTRACT

The present disclosure is directed to a non-destructive process for removing metals, metal ions and metal oxides in alumina-based materials without destroying alumina, allowing the regeneration of alumina-based catalysts. The non-destructive process uses an extracting agent that sequesters metals, metal ions and/or metal oxides present in alumina-based materials without destroying the alumina, allowing the regeneration of alumina-based catalysts.

18 Claims, No Drawings

NON-DESTRUCTIVE PROCESS FOR REMOVING METALS, METAL IONS AND METAL OXIDES FROM ALUMINA-BASED MATERIALS

CROSS-REFERENCE TO RELATED APPLICATIONS

The present application is a national stage entry under 35 U.S.C. 371 of PCT Patent Application No. PCT/MX2018/050017, filed Jul. 27, 2018, which claims priority to Mexican Patent Application MX/a/2017/010801, filed Aug. 23, 2017, the entire contents of each of which are incorporated herein by reference.

DESCRIPTION

Technical Field

The present disclosure deals with a non-destructive process for removing metals, metal ions and metal oxides present in alumina-based materials whose main application is in the regeneration of alumina-based catalysts, the recovery and/or recycling of metals and the reuse of alumina catalysts employed mainly in oil industry processes as hydrotreating, isomerization and naphtha catalytic reforming catalysts.

In this sense, it is important to point out that such catalysts are used mainly to eliminate sulfur, nitrogen and silicon compounds as well as to increase the octane number and isomerize compounds present in the feedstock currents of hydrotreating, isomerization and naphtha catalytic reforming processes used in the oil industry.

Background

There are different procedures and/or methods for removing metal oxides present in alumina-based materials such as those reported in:

a) The U.S. Pat. No. 6,180,072 for recovering metals from catalysts considers the use of one or more catalysts containing at least a metal sulfide; atmospheric leaching of the catalyst; separation of a first liquid current and a first solid from the leached suspension; pressure leaching of the first solid; separation of a second liquid current and a second solid from the second leached suspension; gathering of the first and second liquid currents; oxidation of the combined liquid current; cooling of the oxidized liquid current; pH adjusting of the oxidized liquid current; putting in contact of the cooled-down-oxidized-liquid current with an organic solvent containing an extracting agent; separation of soluble metal species from the organic phase; pH adjusting of the aqueous phase for the selective precipitation of at least one metal as metal salt; and separation of the metal salt from the aqueous phase;

b) The U.S. Pat. No. 4,292,282 describes how to recover molybdenum, vanadium and metallic aluminum from residues of a hydrodesulfurization catalyst from which hydrocarbons have been removed; the process implies chlorination using a chlorine gaseous mixture, hydrochloric acid and water at temperatures ranging from 200-400° C., where molybdenum and vanadium are volatilized as oxychlorides and aluminum as chloride, absorbing these compounds in an aqueous solution of hydrochloric acid;

c) The U.S. Pat. No. 5,017,280 deals with a process for removing S and Fe and recovering V, Ni and Co from carbon or oil derivatives or minerals. The process is based on an oxidative extraction using hypochlorous acid. The process can be applied specifically in the recovery of V and Ni;

d) The U.S. Pat. No. 4,973,462 describes a process for producing high purity silica by adding directly an aqueous solution of alkaline silicate (water glass) to a mineral acid solution such as hydrochloric acid, nitric acid and sulfuric acid to dissolve impurities present in the mineral acid and form a silica precipitate, which is afterwards rinsed with a mineral acid solution;

e) The U.S. Pat. No. 5,242,670 gives the details of a process for digesting a silica/inorganic alumina matrix using hydrofluoric acid to produce silicon tetrafluoride and aluminum fluoride where the starting stage deals with the reaction of the matrix material with hydrofluoric acid to produce silicon tetrafluoride gas and a solution/suspension that consists of non-digested aluminum fluoride, oxides and other soluble and insoluble fluoride materials. The silicon tetrafluoride gas is purified by condensation of pollutants in cold traps and reacts with aqueous sodium fluoride to produce a solution/suspension of a fluorosilicate salt, which is passed through a filter press to separate sodium fluorosilicate powder from the solution/suspension. The sodium fluorosilicate powder is dried and placed in an oven at 600-650° C. to produce substantially pure silicon tetrafluoride gas and sodium fluoride powder for its collection. The recovery of aluminum fluoride is accomplished by washing with water the solution/suspension that contains aluminum fluoride, non-digested oxides and additional soluble and insoluble fluorinated materials to dissolve completely all the water-soluble materials; all the insoluble materials are separated by a filter press, and the remaining solution containing aluminum fluoride and other water-soluble fluorides is dried in an evaporator while condensing water and excess hydrofluoric acid vapors in a condenser; aluminum fluoride or heavy-metal fluorides are recovered from the dried solution and/or high-purity hydrofluoric acid is separated from the liquid condensate by fractional distillation; and f) The Patent FR2533588 refers to a process for recovering at least a metal from group VIII and at least a metal from group Vb or VIb from exhausted hydrotreating catalysts. The treated load is thermally treated at 400-600° C. and is afterwards put in contact with a first ammonia/ammonium salt aqueous solution which produces the first concentrated liquor. The load that has been leached one time is put in contact with a second $SO_2$ aqueous solution that produces the second concentrated liquor. Metals are precipitated from the second liquor with $H_2S$ and the precipitate is heated along with the load without reaching calcination. The metals from groups Vb and VIb from the first concentrated liquor are transferred to a first organic solution by means of liquid phase ionic exchange. The first organic solution is exhausted by using an aqueous solution and metals are separated by successive precipitations. The metals from group VIII are separated and purified by in-series-liquid-phase ionic exchange. This process is used to treat particles from exhausted hydrotreating catalysts.

In this sense, it is important to note that the procedures and/or known methods for removing metals, metal ions and metal oxides from alumina-based materials, such as those mentioned above, use some kind of inorganic acid or inorganic base, or a mixture thereof, to carry out a digestion process, which modifies the alumina properties and those of any other element present in the material, destroying alumina and preventing its reuse.

The above technologies, known by the applicant, were surpassed by the non-destructive process of the present disclosure due to the removal of metals, metal ions and metal oxides present in alumina-based materials without destroying alumina; for this reason, one embodiment of the present disclosure is focused on the regeneration of alumina-based catalysts, the recovery and/or recycling of metals and the reuse of alumina from catalysts employed mainly in the oil industry as hydrotreating, isomerization and naphtha catalytic reforming catalysts.

Then, an objective of the present disclosure is to provide a non-destructive process for removing metals, metal ions and metal oxides present in alumina-based materials that allows the reuse of alumina.

Another objective of the present disclosure is to introduce a non-destructive process for removing metals, metal ions and metal oxides present in alumina-based materials that is mainly used in the regeneration and recovery and/or recycling of metals from catalysts that are mainly used to eliminate sulfur, nitrogen and silicon compounds and also to increase the octane number and isomerize compounds in feedstocks of hydrotreating, isomerization and naphtha catalytic reformation processes in the oil industry.

An additional objective of the present disclosure is to present a non-destructive process for removing metals, metal ions and metal oxides present in alumina-based materials that forms alkoxides, coordination compounds and/or chelates with oxidized metals without modifying the properties of the alumina-based material.

Another objective of the present disclosure is to provide a non-destructive process for removing metals, metal ions and metal oxides present in alumina-based materials that uses a sequestering or complexing agent of metals, metal ions and/or metal oxides present in alumina-based materials without modifying substantially the content of other materials present in the alumina-based material.

The previous and other objectives concerning the present disclosure will be described with more clarity and in detail in the following chapters.

DETAILED DESCRIPTION

The present disclosure deals with a non-destructive process for removing metals, metal ions and metal oxides present in alumina-based materials without destroying alumina; then, one object of the present disclosure is regeneration of alumina-based catalysts, recovery and/or recycling of metals and reusing alumina from catalysts employed mainly in oil industry processes as hydrotreating, isomerization and naphtha catalytic reforming catalysts.

In this sense, it is important to mention that such catalysts are used mainly to eliminate sulfur, nitrogen and silicon compounds and to increase the octane number and isomerize compounds present in feedstocks of hydrotreating, isomerization and naphtha catalytic reforming processes in the oil industry.

The non-destructive process of the present disclosure includes the following stages:
 a) Mixing of the solid material or mixture of solid materials that contain metals, metal ions and/or metal oxides as powders, ground and/or original-form materials (extrudates and/or spheres) with an extracting agent, such as an alcohol;
 b) Reaction of the as-obtained mixture at 10-350° C. from 10 minutes (min) to 500 hours (h), for example, at 10-300° C., from 1 to 96 hours;
 c) Separation by centrifugation, decantation or filtration of the mixture containing the solid, extracting agent and metals, metal ions and/or dissolved metal oxides (complexed metals);
 d) Washing of the solid with water, an alcohol, an ammonium hydroxide solution or with a hydrocarbon or hydrocarbon mixture; and
 e) Drying of the solid with low content of metals, metal ions and/or metal oxides.

The non-destructive process of the present disclosure is applied in alumina-based materials that contain, among others, the following chemical elements and/or their mixtures: Si, V, Cr, Mn, Fe, Co, Ni, Cu, Zn, Zr, Nb, Mo, Ru, Rh, Pd, Ag, Cd, W, Re, Os, Ir, Pt and Au.

The metals, metal ions and/or metal oxides present in the alumina-based material to which the non-destructive process of the present disclosure is applied, may be found in inorganic form.

The alcohol employed at stage a) as extracting agent to mix the solid material that contains the metals, metal ions and/or metal oxides may be a polyol, and in some embodiments may be glycerin, ethylene glycol and/or 1,5-pentanodiol, which present excellent properties to extract selectively the metals, metal ions and/or metal oxides without modifying the properties of the alumina-based material. The aforementioned is achieved because glycerin, ethylene glycol and/or 1,5-pentanediol act as complexing or sequestering agents of the metals, metal ions and/or metal oxides deposited in the alumina-based material, producing a gel that contains the metals, metal ions and/or metal oxides that are removed from the solid.

The washing from stage d) may be performed with distilled water, methanol, ethanol, propanol, with an ammonium hydroxide solution from 1 to 35 wt. % or with hydrodesulfurized naphtha, reforming compound or a hexane/heptane mixture.

The non-destructive process of the present disclosure takes place in a batch reactor (batch), with or without stirring, or in a continuous flow reactor, with or without pressure from 0.5 to 75 kg/cm$^2$.

In a continuous flow reactor, the non-destructive process of the present disclosure may include the following stages:
 a) Compaction of the solid material or mixture of solid materials that contain the metals, metal ions and/or metal oxides as powders, ground and/or original-form materials (extrudates and/or spheres) in a continuous flow reactor with or without pressure from 0.5 to 75 Kg/cm$^2$, temperature increase from 50 to 300° C. and feeding of an extracting agent, such as an alcohol, where the alcohol may be a polyol or glycerin, ethylene glycol and/or 1,5-pentanediol at a flow rate from 1 to 500 mL/h per solid gram, keeping the same pressure and temperature from 1 to 150 h;
 b) Interruption of the extracting agent feeding and temperature decrease from 150 to 50° C. to cool down the reaction system;
 c) Washing of the solid material with an alcohol, preferably methanol, ethanol or propanol or with a hydrocarbon or hydrocarbon mixture, preferably hyrodesulfurized naptha, reforming compound or a hexane/heptane mixture at a flow rate from 1 to 500 mL/h per solid gram from 24 to 80 h, stopping afterwards the flow rate of alcohol, hydrocarbon or hydrocarbon mixture, bringing the system temperature and pressure conditions to 10 to 25° C. and 0.5 to 1 Kg/cm$^2$, respectively; and d) Drying of the recovered solid material with low content of metals, metal ions and/or metal oxides.

In the non-destructive process featured in the present disclosure, pressurization and cooling of the system in a continuous flow reactor may be carried out with nitrogen.

EXAMPLES

What follows is the description of some practical examples aimed at offering a better understanding of the present disclosure without limiting its scope.

Example No. 1

An exhausted catalyst obtained from a naphtha hydrotreating industrial plant was oxidized by using an $O_2/N_2$ mixture, being submitted afterwards to an elemental composition analysis of molybdenum and nickel. The corresponding results are shown in Table No. 1.

TABLE NO. 1

| Elemental analysis of an exhausted catalyst from a naphtha hydrotreating plant, which was afterwards oxidized ||
| --- | --- |
| Mo (wt. %) | Ni (wt. %) |
| 12.1 | 2.1 |

10 g of an exhausted and oxidized catalyst (Table No. 1) were ground to pass through a 100 mesh sieve and mixed with 600 mL of glycerin in a batch reactor. The mixture was heated from 20 to 250° C. and stirred at 100 rpm for 10 h; afterwards, the mixture was allowed to cool down to 100° C. The solid was separated from glycerin by centrifugation and washed with 500 mL of an isopropanol aqueous solution. Finally, the solid was dried in an oven at 60° C. for 8 h. This very solid was analyzed by atomic absorption, finding that 48 and 55% of molybdenum and nickel, respectively, had been removed from the initial catalyst content.

Example No. 2

10 g of an exhausted and oxidized catalyst (Table No. 1), which was featured in Example No. 1, were ground to pass through a 200 mesh sieve and mixed with 1200 mL of glycerin in a batch reactor. The mixture was heated from 20 to 250° C. and stirred at 100 rpm for 10 h; afterwards, the mixture was allowed to cool down to 110° C. The solid was separated from glycerin by centrifugation and washed with 500 mL of reforming product. Finally, the solid was dried in an oven at 60° C. for 8 h. The obtained solid was analyzed by atomic absorption, finding that 52 and 63% of molybdenum and nickel, respectively, had been removed from the initial catalyst content.

Example No. 3

10 g of an exhausted and oxidized catalyst (Table No. 1), which was used in Example No. 1, were ground to pass through a 200 mesh sieve and mixed with 600 mL of ethylene glycol in a batch reactor. The mixture was heated from 20 to 180° C. and stirred at 100 rpm for 10 h. After, the mixture was allowed to cool down to 110° C., separating the solid from ethylene glycol by centrifugation and washing it with 500 mL of ethanol. Finally, the solid was dried in an oven at 60° C. for 8 h. The as-obtained solid was analyzed by atomic absorption, finding that 31 and 39% of molybdenum and nickel, respectively, had been removed from the starting catalyst content.

Example No. 4

An exhausted catalyst obtained from a naphtha hydrotreating industrial plant was oxidized using an $O_2/N_2$ mixture and afterwards submitted to an elemental composition analysis of molybdenum and cobalt, obtaining the results featured in Table No. 2.

TABLE NO. 2

| Elemental analysis of an exhausted catalyst from a naphtha hydrotreating plant, which was afterwards oxidized ||
| --- | --- |
| Mo (wt. %) | Co (wt. %) |
| 11.5 | 3.2 |

10 g of an exhausted and oxidized catalyst (Table No. 2) were ground to pass through a 100 mesh sieve and mixed with 600 mL of glycerin in a batch reactor. The mixture was heated from 20 to 240° C. and stirred at 100 rpm for 12 h. After, the mixture was cooled down to 100° C. and the solid was separated from glycerin by centrifugation and washed with 500 mL of hydrodesulfurized naphtha. Finally, the solid was dried in an oven at 60° C. for 8 h and analyzed by atomic absorption, finding that 46 and 42% of molybdenum and cobalt, respectively, had been removed from the initial catalyst content.

Example No. 5

10 g of an exhausted and oxidized catalyst (Table No. 2), which was used in Example No. 4, were ground to pass through a 100 mesh sieve and mixed with 600 mL of ethylene glycol in a batch reactor. The mixture was heated from 20 to 170° C. and stirred at 100 rpm for 15 h. Afterwards, the mixture was cooled down to 110° C. and the solid was separated from ethylene glycol by centrifugation and washed with 500 mL of an ammonium hydroxide solution at 35 wt. %. Finally, the solid was dried in an oven at 60° C. for 8 h. The solid was analyzed by atomic absorption, finding that 32 and 33% of molybdenum and cobalt, respectively, had been removed from the starting catalyst content.

Example No. 6

A fresh catalyst, in its oxidized form, for naphtha hydrotreating, was submitted to elemental composition analysis of molybdenum and nickel. The results are shown in Table No. 3.

TABLE NO. 3

| Elemental analysis of a fresh catalyst, in its oxidized form, from a naphtha hydrotreating plant ||
| --- | --- |
| Mo (wt. %) | Ni (wt. %) |
| 13.2 | 2.5 |

10 g of a fresh catalyst (Table No. 3) were ground to pass through a 100 mesh sieve and mixed with 1200 mL of glycerin in a batch reactor. The mixture was heated from 20 to 265° C. and stirred at 100 rpm for 18 h. Afterwards, the mixture was cooled down to 100° C. and the solid was separated from glycerin by centrifugation and washed with 500 mL of a hexane/heptane mixture. Finally, the solid was dried in an oven at 60° C. for 8 h and analyzed by atomic absorption, finding that 55 and 68% of molybdenum and nickel, respectively, had been removed from the initial catalyst content.

Example No. 7

A fresh catalyst, in its oxidized form, for naphtha catalytic reforming, was submitted to an elemental composition analysis of platinum and rhenium. The obtained results are shown in Table No. 4.

TABLE NO. 4

Elemental analysis of a fresh catalyst, in its oxidized form, from a naphtha catalytic reforming plant

| Pt (wt. %) | Re (wt. %) |
|---|---|
| 0.39 | 0.40 |

10 g of a fresh catalyst (Table No. 4) were ground to pass through a 200 mesh sieve and mixed with 1500 mL of glycerin in a batch reactor. The mixture was heated from 20 to 275° C. and stirred at 100 rpm for 15 h. Afterwards, the mixture was cooled down to 100° C. and the solid was separated from glycerin by centrifugation and washed with 500 mL of reforming product. Finally, the solid was dried in an oven at 60° C. for 8 h and analyzed by atomic absorption, finding that 36 and 39% of platinum and rhenium, respectively, had been removed from the initial catalyst content.

Example No. 8

10 g of a fresh catalyst (Table No. 4), which was used in Example No. 7, were ground to pass through a 100 mesh sieve and mixed with 1000 mL of ethylene glycol in a batch reactor. The mixture was heated from 20 to 160° C. and stirred at 100 rpm for 20 h. Afterwards, the mixture was cooled down to 110° C. and the solid was separated from ethylene glycol by centrifugation and washed with 500 mL of methanol. Finally, the solid was dried in an oven at 60° C. for 8 h. The solid was analyzed by atomic absorption, finding that 28 and 27% of platinum and rhenium, respectively, had been removed from the starting catalyst content.

Example No. 9

14 g of exhausted catalyst (Table No. 1), which was used in Examples No. 1 to 3, were ground to pass through a 40 mesh sieve and compacted in a continuous flow tubular reactor, pressurizing at 5.0 kg/cm$^2$ using nitrogen; afterwards, the temperature was increased from 25 to 180° C. at 60° C./min, starting the glycerin feeding at 350 mL/h and increasing the temperature up to 260° C. at 60° C./h, keeping the same pressure (5.0 kg/cm$^2$) and temperature at 260° C. for 24 h. After 24 h, the temperature was decreased from 260 to 120° C. at 60° C./h; then, the glycerin feeding was stopped and nitrogen was fed, decreasing the temperature from 120 to 60° C. at 180° C./h and adjusting the system pressure to 2 kg/cm$^2$. The solid was washed by feeding methanol at 280 mL/h for 2 h, stopping the methanol flow to set the system at 20° C. and 0.8 kg/cm$^2$. The recovered solid was dried in an oven at 100° C. for 5 h and analyzed by atomic absorption, finding that 56 and 64% of molybdenum and nickel, respectively, had been removed from the initial catalyst content.

Example No. 10

14 g of exhausted catalyst (Table No. 1), which was used in Examples No. 1 to 3 and 9, were ground to pass through a 60 mesh sieve and compacted in a continuous flow tubular reactor, pressurizing at 10.0 kg/cm$^2$ using nitrogen; afterwards, the temperature was increased from 25 to 180° C. at 60° C./min, starting the ethylene glycol feeding at 350 mL/h and increasing the temperature up to 270° C. at 60° C./h, keeping the same pressure (10.0 kg/cm$^2$) and temperature at 270° C. for 24 h. After 24 h, the temperature was decreased from 270 to 120° C. at 60° C./h; then, the ethylene glycol feeding was stopped and nitrogen was fed, decreasing the temperature from 120 to 60° C. at 180° C./h and adjusting the system pressure to 2 kg/cm$^2$. The solid was washed by feeding ethanol at 280 mL/h for 2 h, stopping the ethanol flow to set the system at 20° C. and 0.8 kg/cm$^2$. The recovered solid was dried in an oven at 100° C. for 5 h and analyzed by atomic absorption, finding that 59 and 65% of molybdenum and nickel, respectively, had been removed from the initial catalyst content.

Example No. 11

14 g of exhausted catalyst (Table No. 1), which was used in Examples No. 1 to 3, 9 and 10, were ground to pass through a 60 mesh sieve and compacted in a continuous flow tubular reactor, pressurizing at 25.0 kg/cm$^2$ using nitrogen; afterwards, the temperature was increased from 25 to 180° C. at 60° C./min, starting the 1,5-pentanediol feeding at 350 mL/h and increasing the temperature up to 250° C. at 60° C./h, keeping the same pressure (25.0 kg/cm$^2$) and temperature at 250° C. for 30 h. After 30 h, the temperature was decreased from 250 to 120° C. at 60° C./h; then, the 1,5-pentanediol feeding was stopped and nitrogen was fed, decreasing the temperature from 120 to 60° C. at 180° C./h and adjusting the system pressure to 2 kg/cm$^2$. The solid was washed by feeding reforming product at 280 mL/h for 2 h, stopping the reforming product flow to set the system at 20° C. and 0.8 kg/cm$^2$. The recovered solid was dried in an oven at 100° C. for 5 h and analyzed by atomic absorption, finding that 53 and 60% of molybdenum and nickel, respectively, had been removed from the starting catalyst content.

Example No. 12

14 g of exhausted catalyst (Table No. 2), which was used in Examples No. 4 and 5, were ground to pass through a 20 mesh sieve and compacted in a continuous flow tubular reactor, pressurizing at 15.0 kg/cm$^2$ using nitrogen; afterwards, the temperature was increased from 25 to 180° C. at 60° C./min, starting the glycerin feeding at 350 mL/h and increasing the temperature up to 250° C. at 60° C./h, keeping the same pressure (15.0 kg/cm$^2$) and temperature at 250° C. for 30 h. After 30 h, the temperature was decreased from 250 to 120° C. at 60° C./h; then, the glycerin feeding was stopped and nitrogen was fed, decreasing the temperature from 120 to 60° C. at 180° C./h and adjusting the system pressure to 2 kg/cm$^2$. The solid was washed by feeding propanol at 280 mL/h for 2 h, stopping the propanol flow to set the system at 20° C. and 0.8 kg/cm². The recovered solid was dried in an oven at 100° C. for 5 h and analyzed by atomic absorption, finding that 52 and 53% of molybdenum and cobalt, respectively, had been removed from the starting catalyst content.

Example No. 13

14 g of exhausted catalyst (Table No. 4), which was used in Examples No. 7 and 8, were ground to pass through a 60 mesh sieve and compacted in a continuous flow tubular reactor, pressurizing at 30.0 kg/cm² using nitrogen; afterwards, the temperature was increased from 25 to 180° C. at 60° C./min, starting the glycerin feeding at 350 mL/h and increasing the temperature up to 260° C. at 60° C./h, keeping the same pressure (30.0 kg/cm²) and temperature at 260° C. for 24 h. After 24 h, the temperature was decreased from 260 to 120° C. at 60° C./h; then, the glycerin feeding was stopped and nitrogen was fed, decreasing the temperature from 120 to 60° C. at 180° C./h and adjusting the system pressure to 2 kg/cm². The solid was washed by feeding heptane at 280 mL/h for 2 h, stopping the heptane flow to set the system at 20° C. and 0.8 kg/cm². The recovered solid was dried in an oven at 100° C. for 5 h and analyzed by atomic absorption, finding that 42 and 42% of platinum and rhenium, respectively, had been removed from the initial catalyst content.

Example No. 14

750 g of fresh catalyst (Table No. 3), which was used in Example No. 6, in its commercial size (1/20") and shape (tetralobular), were compacted in a continuous flow tubular reactor, pressurizing at 20.0 kg/cm² using nitrogen; afterwards, the temperature was increased from 25 to 280° C. at 60° C./min, starting the ethylene glycol feeding at 3325 mL/h, keeping the same pressure (20.0 kg/cm²) and temperature at 280° C. for 80 h. After 80 h, the temperature was decreased from 280 to 120° C. at 60° C./h; then, the ethylene glycol feeding was stopped and nitrogen was fed, decreasing the temperature from 120 to 60° C. at 180° C./h and adjusting the system pressure to 8 kg/cm². The solid was washed by feeding hydrodesulfurized naphtha at 1800 mL/h for 6 h, stopping the hydrodesulfurized naphtha flow to set the system at 20° C. and 0.8 kg/cm². The recovered solid was dried in an oven at 100° C. for 5 h and analyzed by atomic absorption, finding that 70 and 78% of molybdenum and nickel, respectively, had been removed from the starting catalyst content.

To better visualize the advantages of the non-destructive process featured in the present disclosure, a summary of the main data from Examples No. 1 to 12, which were shown with illustrative purposes and without limited scope, is shown in Table No. 5.

The results in Table No. 5 show that the non-destructive process of the present disclosure displayed a higher removal percentage of metals (M) when a continuous flow tubular reactor was used (metal removal of at least 42%) than when employing a batch reactor (metal removal of at least 27%).

TABLE NO. 5

Summary of removal percentages of metals (M) contained in fresh and exhausted catalysts from different processes

| Catalyst | Employed reactor | Molybdenum content (Mo) wt. % | Nickel content (Ni) wt. % | Removed molybdenum (Mo) % | Removed nickel (Ni) % |
|---|---|---|---|---|---|
| Exhausted | | 12.1 | 2.1 | | |
| Example No. 1 | Batch | | | 48 | 55 |
| Example No. 2 | Batch | | | 52 | 63 |
| Example No. 3 | Batch | | | 31 | 39 |
| Example No. 9 | Continuous flow | | | 56 | 64 |
| Example No. 10 | Continuous flow | | | 59 | 65 |
| Example No. 11 | Continuous flow | | | 53 | 60 |

| Catalyst | Employed reactor | Molybdenum content (Mo) wt. % | Nickel content (Ni) wt. % | Removed molybdenum (Mo) % | Removed nickel (Ni) % |
|---|---|---|---|---|---|
| Fresh | | 13.2 | 2.5 | | |
| Example No. 6 | Batch | | | 55 | 68 |
| Example No. 14 | Continuous flow | | | 70 | 78 |

| Catalyst | Employed reactor | Molybdenum content (Mo) wt. % | Cobalt content (Co) wt. % | Removed molybdenum (Mo) % | Removed cobalt (Co) % |
|---|---|---|---|---|---|
| Exhausted | | 11.5 | 3.2 | | |
| Example No. 4 | Batch | | | 46 | 42 |
| Example No. 5 | Batch | | | 32 | 33 |
| Example No. 12 | Continuous flow | | | 52 | 53 |

| Catalyst | Employed reactor | Platinum content (Pt) wt. % | Rhenium content (Re) wt. % | Removed platinum (Pt) % | Removed rhenium (Re) % |
|---|---|---|---|---|---|
| Fresh | | 0.39 | 0.40 | | |
| Example No. 7 | Batch | | | 36 | 39 |
| Example No. 8 | Batch | | | 28 | 27 |
| Example No. 13 | Continuous flow | | | 42 | 42 |

To emphasize the benefits provided by the non-destructive process featured in the present disclosure, the following example is given:

Example No. 15

1.0 g of fresh catalyst (Table No. 3), which was used in Examples No. 6 and 14, was ground to pass through a 200 mesh sieve and mixed with 50 mL of butanol and refluxed for 6 h at 80° C.; after 6 h, the temperature was decreased to 20° C. and the solid was filtered, dried at 60° C. and analyzed by atomic absorption, finding that 7.5 and 9.1% of molybdenum and nickel, respectively, had been removed from the initial catalyst content.

The results obtained in this example, in comparison with those from Examples No. 1 to 3, 6, 9 to 11 and 14, show the following main features of the non-destructive process introduced in the present disclosure:
- a) The advantages of carrying out the process in either a batch or continuous flow reactor with or without pressure because it removes:
   - Up to 55 wt. % of molybdenum (Mo) and 68 wt. % of nickel (Ni) initially present by employing a batch reactor, and
   - Up to 70 wt. % of molybdenum (Mo) and 78 wt. % of nickel (Ni) initially present by employing a continuous flow reactor;
- b) The importance of both the different stages that are part of the process featured in the present invention and the operation conditions employed to carry them out; and
- c) The qualities of the employed extracting agents, preferably an alcohol such as a polyol, more preferably glycerin, ethylene glycol or 1,5-pentanediol to remove selectively metals, metal ions and/or metal oxides present in alumina-based materials without modifying their properties.

What is claimed is:

1. A non-destructive process for removing a) metals, b) metal ions and c) metal oxides present in alumina-based materials, comprising the following stages:
   - a) oxidizing and mixing of starting materials, the starting materials comprising one of a solid material or a mixture of solid materials that contains at least one of a) metals, b) metal ions or c) metal oxides, with an extracting agent, resulting in an obtained mixture;
   - b) reaction of the obtained mixture at a temperature in a range of 10° C. to 350° C. for a time in a range of 10 minutes to 500 hours, resulting in a reacted mixture;
   - c) separation by one of centrifugation, decantation or filtration of the reacted mixture to obtain a solid;
   - d) washing of the solid with one of water, an alcohol, an ammonium hydroxide solution, or with a hydrocarbon or hydrocarbon mixture; and
   - e) drying of the solid;
   wherein the at least one of the a) metals, b) metal ions, or c) metal oxides includes a chemical element selected from the group consisting of V, Cr, Mn, Fe, Co, Ni, Cu, Zn, Zr, Nb, Mo, Ru, Rh, Pd, Ag, Cd, W, Re, Os, Ir, Pt and Au.

2. The non-destructive process, according to claim 1, wherein the metals, metal ions or metal oxides present in the alumina-based materials are found in inorganic form as at least one of powders, ground or original-form materials, the original-form materials comprising extrudates or spheres.

3. The non-destructive process, according to claim 1, wherein the extracting agent is a polyol.

4. The non-destructive process, according to claim 1, wherein the temperature is in a range of 10° C. to 300° C. and the time is in a range of 1 h to 96 h.

5. The non-destructive process, according to claim 1, wherein the washing of the solid is carried out with at least one of distilled water, methanol, ethanol, or propanol, with an ammonium hydroxide solution from 1 to 35 wt. %, or with one of hydrodesulfurized naphtha, reforming product or a hexane/heptane mixture.

6. The non-destructive process, according to claim 1, wherein the process is carried out in a batch reactor or in a continuous flow reactor.

7. The non-destructive process, according to claim 1, further comprising pressurization and cooling operations carried out with nitrogen, and wherein the pressure ranges from 0.5 kg/cm$^2$ to 75 kg/cm$^2$.

8. The non-destructive process, according to claim 6, wherein, when the continuous flow reactor is employed, metal removal percentages of at least 42% of the metals initially contained in the starting materials are achieved.

9. The non-destructive process, according to claim 6, wherein, when the batch reactor is employed, metal removal percentages of at least 27% of the metals initially contained in the starting materials are accomplished.

10. The non-destructive process, according to claim 1, wherein the process results in a regeneration of alumina-based catalysts, in a recovery or recycling of metals and in a reuse of alumina from catalysts used mainly in oil industry processes as hydrotreating, isomerization and naphtha catalytic reforming.

11. A non-destructive process for removing a) metals, b) metal ions and c) metal oxides present in alumina-based materials without destroying alumina, comprising:
   - a) oxidizing and compaction of starting materials, the starting materials comprising one of solid material or a mixture of solid materials that contain at least one of a) metals, b) metal ions or c) metal oxides with an increase in temperature from 50° C. to 300° C., and feeding of an extracting agent to the starting materials, said extracting agent comprising an alcohol, at a flow rate from 1 mL/h to 500 mL/h per solid gram;
   - b) interruption of the feeding of the extracting agent, and decreasing the temperature 150° C. to 50° C., resulting in a solid material;
   - c) washing of the solid material in b) with one of an alcohol, or a hydrocarbon or hydrocarbon mixture, at a flow rate from 1 mL/H to 500 mL/h per solid gram for a time in a range of 30 minutes to 85 hours, and subsequently bringing the temperature to 10° C. to 25° C., and the pressure to 0.5 to 1 Kg/cm', resulting in recovered solid material with a low content of metals, metal ions, or metal oxides; and
   - d) drying of the recovered solid material;
   wherein the process is carried out in a continuous flow reactor and the at least one of a) metals, b) metal ions, or c) metal oxides includes a chemical element selected from the group consisting of V, Cr, Mn, Fe, Co, Ni, Cu, Zn, Zr, Nb, Mo, Ru, Rh, Pd, Ag, Cd, W, Re, Os, Ir, Pt and Au.

12. The non-destructive process, according to claim 11, wherein the metals, metal ions or metal oxides present in the alumina-based material are in an inorganic form as at least one of a powder, a ground material or an original form material comprising an extrudate or sphere.

13. The non-destructive process, according to claim 11, wherein the alcohol is a polyol.

14. The non-destructive process, according to claim 11, wherein the washing of the solid material is done with one of a methanol, ethanol, propanol or with hydrodesulfurized naphtha, reforming product or a hexane/heptane mixture, and is carried out at a flow rate from 1 mL/h to 300 mL/h per solid gram, for a time period of 24 h to 80 h.

15. The non-destructive process, according to claim 11, wherein the pressure in the continuous flow reactor ranges from 0.5 $kg/cm^2$ to 75 $kg/cm^2$.

16. The non-destructive process, according to claim 15, wherein the pressurization and cooling are done with nitrogen.

17. The non-destructive process, according to claim 11, wherein the process results in at least 42% of each of the metals initially contained in the starting materials being removed.

18. The non-destructive process, according to claim 11, wherein the process results in a regeneration of alumina-based catalysts, in a recovery or recycling of metals and in a reuse of alumina from catalysts used in oil industry processes as hydrotreating, isomerization and naphtha catalytic reforming catalysts.

\* \* \* \* \*